J. McWILLIAMS,

Assignor to McWILLIAMS MANUFACTURING CO.

Die-Holder for Screw-Presses.

No. 9,123. Reissued Mar. 23, 1880.

WITNESSES

Chas. G. Calder

Wm. L. Cooper

INVENTOR:

John McWilliams by Joseph A. Miller
atty

N. PETERS, PHOTO-LITHOGRAPHER, WASHINGTON, D. C.

UNITED STATES PATENT OFFICE.

JOHN McWILLIAMS, OF PROVIDENCE, RHODE ISLAND, ASSIGNOR TO McWILLIAMS MANUFACTURING COMPANY.

DIE-HOLDER FOR SCREW-PRESSES.

SPECIFICATION forming part of Reissued Letters Patent No. 9,123, dated March 23, 1880.

Original No. 93,215, dated August 3, 1869. Application for reissue filed December 3, 1879.

*To all whom it may concern:*

Be it known that I, JOHN McWILLIAMS, of Providence, in the county of Providence and State of Rhode Island, have invented a new and useful Improvement in Die-Holders for Presses; and I hereby declare that the following is a full, clear, and exact description of the same, reference being had to the accompanying drawings, forming part of this specification.

The object of this invention is to so construct a die-holder that the dies, instead of being secured by a wedge or driven into the holder, can be readily secured by means of a screw.

The invention consists in the use of a sliding piece moving in a slot arranged to adjust itself automatically to the die and forced against the die by a screw.

Figure 1:
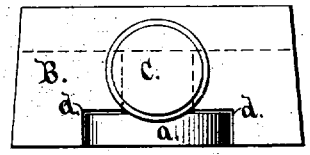
Figure 2:
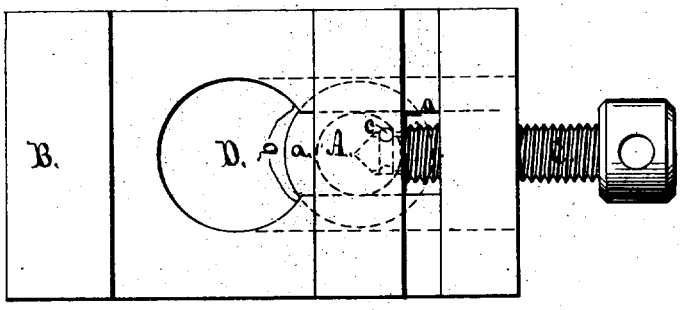
Figure 3:
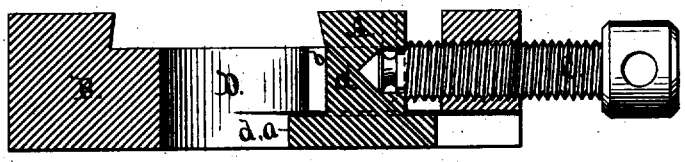
Figure 4:
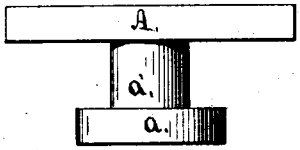

Figure 1 is an end view of the die-holder. Fig. 2 is a top view of the same, the slot in which the sliding piece is secured, as also the post and disk moving in the slot, being shown in broken lines. Fig. 3 is a sectional view through the center of the die-holder. Fig. 4 is a view of the sliding clamp.

In the drawings, A represents the sliding clamp-piece, secured by the round post *a'* to the round disk *a*. B is the frame, provided at one end with the screw C, by which the sliding clamp-piece is forced against the die, the other end of the frame B having a fixed abutment, against which the die rests. D is a round central hole, from which the slot *b* extends on a line with the axial line of the screw C. In this slot *b* the post *a'* of the sliding clamp A moves. *d* is a slot wider than the slot *b*, and of, or nearly of, the width of the hole D, arranged to receive the disk *a*.

By this arrangement the sliding clamp A, the post *a'*, and the disk can be made in one piece. They can be readily inserted into the hole D, moved in the slots *b* and *d*, and, while holding the clamp-piece A firmly, allow the same to adjust itself freely to the die.

The screw C may be connected with the sliding clamp by means of a groove turned near the end of the screw, and the pin *c*, passing through a hole in the sliding piece and the groove, will hold the two together. Such connection must, however, be so loose that the sliding clamp A may still freely adjust itself to any inclination of the die.

Heretofore the die-holder in common use has been made solid and the die driven in from one side as a wedge; but by this improvement a great deal of labor is saved, as the dies need not be fitted so carefully as heretofore, and they are more readily adjusted in their places.

Having thus described my invention, I claim as new and desire to secure by Letters Patent—

The combination, with the frame B, having an opening, D, and slots *b d*, of the sliding clamp-piece A, provided with a post, *a'*, which works within slot *b*, and with disk *a*, the latter located within slot *d*, and the screw C, arranged and adapted to adjust the sliding clamp-piece, substantially as set forth.

JOHN McWILLIAMS.

Witnesses:

JOSEPH A. MILLER,

IRA A. SEAMANS.